United States Patent [19]

Larson et al.

[11] 4,393,728

[45] Jul. 19, 1983

[54] FLEXIBLE ARM, PARTICULARLY A ROBOT ARM

[75] Inventors: Ove Larson, Gothenburg; Charles Davidson, Askim, both of Sweden

[73] Assignee: Robotgruppen HB, Gothenburg, Sweden

[21] Appl. No.: 351,589

[22] Filed: Feb. 23, 1982

Related U.S. Application Data

[63] Continuation of Ser. No. 129,202, Mar. 11, 1980, abandoned.

[30] Foreign Application Priority Data

Mar. 16, 1979 [SE] Sweden ................................ 7902366

[51] Int. Cl.³ .......................... B25J 1/02; F16C 1/00; A61F 1/06
[52] U.S. Cl. .......................................... 74/469; 3/1; 3/1.1; 3/1.2; 46/126; 46/152; 74/479; 74/501 R; 81/177 F; 248/160; 248/274; 414/7; 464/149
[58] Field of Search ................ 74/469, 501 R, 501 M, 74/479; 3/1, 1.1, 1.2, 12.3, 12.6, 12.7; 15/104.3 SN; 46/126, 152; 403/220; 81/177 F; 248/160, 274; 414/7; 128/6, 7, DIG. 9; 464/149

[56] References Cited

U.S. PATENT DOCUMENTS

| | | | |
|---|---|---|---|
| 2,241,576 | 5/1941 | Barton | 46/152 |
| 2,421,279 | 5/1947 | Marty | 46/126 |
| 3,060,972 | 10/1962 | Sheldon | 74/501 R X |
| 3,190,286 | 6/1965 | Stokes | 128/6 |
| 3,266,059 | 8/1966 | Stelle | 3/12.3 |
| 3,284,964 | 11/1966 | Saito | 414/7 |
| 3,497,083 | 2/1970 | Anderson et al. | 3/12.3 X |
| 3,546,961 | 12/1970 | Marton | 74/501 R |
| 3,623,566 | 11/1971 | Orloff | 46/152 X |
| 3,927,899 | 12/1975 | Bough | 464/149 X |
| 4,151,757 | 5/1979 | Pitrat | 74/501 M |

*Primary Examiner*—Allan D. Herrmann
*Attorney, Agent, or Firm*—Holman & Stern

[57] ABSTRACT

A flexible arm particularly a robot arm comprising a plurality of elements engaging each other and being arranged in a series, said elements being interconnected via cables and if desired a power transferring actuating device. The purpose of the invention is to provide an arm having very good rigidity in the bending plane of the element and a high torsional resistance together with lower manufacturing costs as compared to conventional robot arms. This has been achieved by each element being designed with arched opposed single-or double-curved segments which with the curved surfaces of each segment engaging the surfaces of the adjacent segments, whereby the elements are arranged when actuated by the power generating and/or power transferring device to have a rolling motion relative to each other.

14 Claims, 14 Drawing Figures

FLEXIBLE ARM, PARTICULARLY A ROBOT ARM

This is a continuation of application Ser. No. 06/129,202, filed Mar. 11, 1980, now abandoned.

TECHNICAL FIELD OF THE INVENTION

The present invention refers to a flexible arm, particularly a robot arm, for supporting and/or manipulating tools or the like, said arm comprising a number of elements arranged in a series for contacting each other and power-generating and/or power-transmitting actuating means arranged to operate between or on the elements or a group of elements respectively.

BACKGROUND OF THE INVENTION

Industrial robots are known in a number of different embodiments and they usually consist of a machine, which without manual supervision or control can change the position of an object or a tool in a three dimensional space to a number of alternative points. The main portion of the industrial robot is its robot arm with its associated motion generating means, control system and program equipment, which two last mentioned means for example can be a minicomputer. Advanced robots have a robot arm with up to six degrees of freedom, i.e. a possibility to move in six different planes, for example motion forwards, backwards, upwards, downwards, rotation to the left and rotation to the right. Since the invention refers to an improvement of the robot arm, the control systems and program equipments will not be closer described and they can besides consist of previously known units.

Conventional robot arms are built up from a number of elements and joints, which besides the tool and the load also must support the equipment for the motion and power generation for the separate elements. This equipment usually comprises pneumatic or hydraulic cylinders, electric motors etc., which means that the elements and the joints have to be relatively coarse, in order to be able to support the equipment. Thus the robot will get a bulky shape and comparatively large external dimensions, which will reduce the flexibility of the robot arm. The pattern of motion and the working ranges of most existing robot arms are otherwise limited and despite all degrees of freedom mainly comprise only a plane circular working field. Another limitation of conventional robot arms is that they cannot be entered into curved or angled spaces or perform manipulations on the side of an object turned away from the robot. Another drawback is that the manufacturing costs are very high.

There have also been developed robot arms with higher flexibility, where the relative motion between each element is achieved via a flexible shaft or a ball joint. Such structural members require high accuracy during manufacture and also careful maintenance. They have limited mobility and their load carrying capacity is entirely depending on the dimensions of the joint member. Ball or shaft joints are furthermore sliding bearings which are exposed to rather high wear if a continuous lubrication cannot be guaranteed. They are furthermore sensitive to dust particles which can penetrate between the bearing surfaces. For this reason the elements have to be carefully encased, which will impair their accessability, maintenance and particularly a satisfactory lubrication. Owing to the very high demands for accuracy the manufacturing costs are very high.

A condition for achieving the desired flexibility without reducing the load carrying capacity of the arm is that the actuating means, i.e. the wires interconnecting the separate elements, are prestressed so that the surface contact between the elements is strong. Considering the desired flexibility the elements contacting each other have hitherto been designed as ball or shaft joints. These joint members have a radius of curvature equal to the height of half the joint member, whereby the problem will arise that the elements do not have a clearly established position for a certain length of the wire that has been taken in. A robot arm according to this embodiment has therefore a good stability only in the plane of curvature of the arm, while its rigidity in a plane perpendicular to the plane of curvature is poor.

Another problem with wire operated robot arms is that they in certain cases also have a poor torsion resistance, which is determined by the shape of the joint member, (i.e. type of contact zone between the elements), and which prevents the elements from being rotated perpendicular to their rolling plane.

BRIEF SUMMARY OF THE INVENTION

The purpose of the present invention is to provide a robot arm having a very big working range and a maximum motion pattern, whereby is meant that it will reach almost all points inside a spherical working field. Another purpose is to provide a robot arm, which can be bent so that it can reach the same point by way of a great number of curvature combinations and thereby provide a very high accessability, which means that it even can pass obstacles of different kinds or bend itself around an object. A further purpose is to provide an arm with a very high rigidity in the element plane of curvature and a high torsion resistance and which is more cheap to manufacture as compared to conventional industrial robots. This has according to the invention been achieved by each element having single- or double-curved segments turned away from each other, the curved contact surfaces of said segments each being located to contact a contact surface of the adjacent segment, the elements being arranged to perform a rolling motion in relation to each other when actuated by said power-generating and/or power-transmitting actuating means.

DETAILED DESCRIPTION OF SOME EMBODIMENTS

Figures 1, 2, 3:
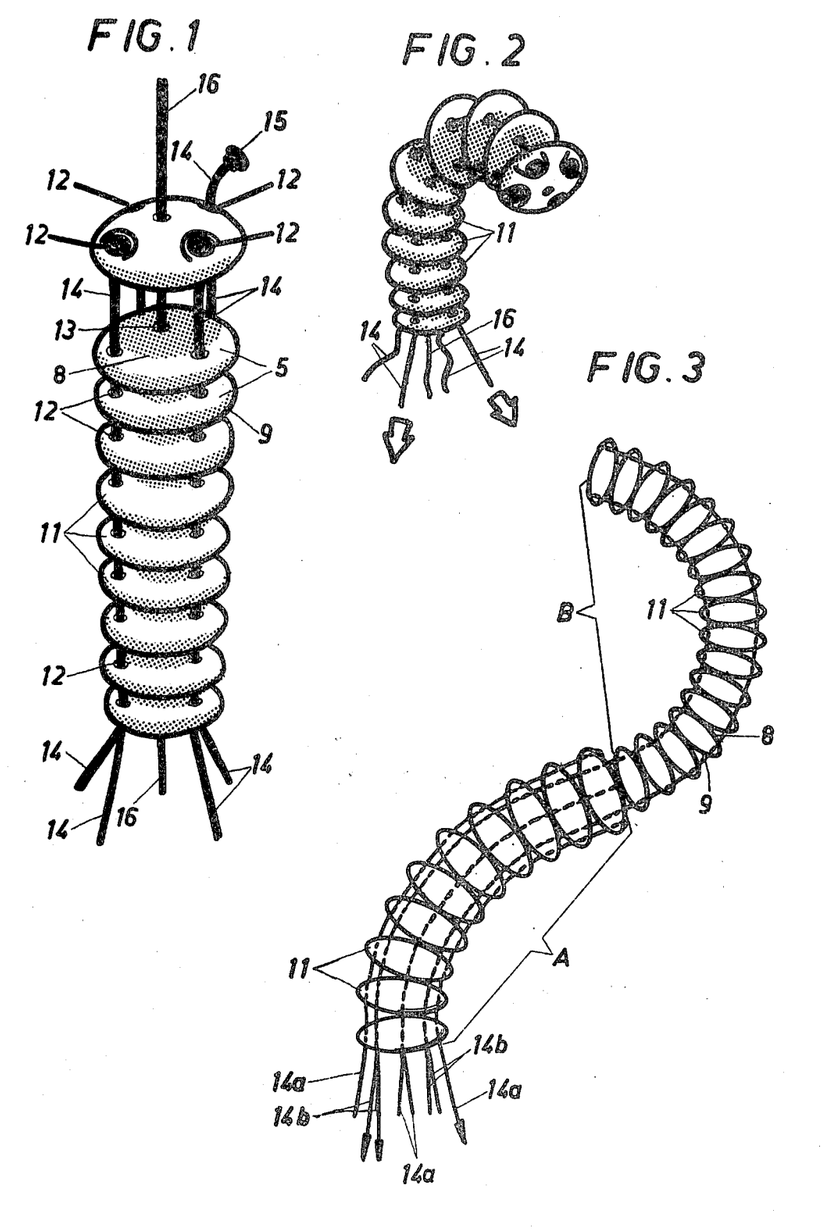
FIG. 1 is a schematic perspective view of a basic embodiment of the arm according to the invention.
FIG. 2 shows the arm according to FIG. 1 in a bent position.
FIG. 3 is a schematic side view of a robot arm according to the invention composed by two groups of elements and thereby being bendable in two different planes or directions.

The flexible arm 10 according to the invention, hereinafter called the robot arm, fundamentally comprises—as shown in the embodiment of FIGS. 1 and 2—a number of elements 11 arranged in series and each being designed as a circular disc with curved contact surfaces. Depending on the extent of bending motions the arm shall be able to perform, each element 11 is provided with a number of holes 12 e.g. four holes placed close to the outer edge of the element and on equal distance from each other and from the centre of the element, said holes being intended for an equal number of actuating means 14. A through-opening 13 is arranged in the centre of the element. The elements are arranged upon each other with the guiding holes 12 being located just opposite each other.

In the top element the guiding holes 12 are countersunk, said counter-sinks receiving termination members 15 arranged at the outer ends of the actuating means. The actuating means 14 consist of cables, wires or the like having good tensile strength. By pulling one or more of the wires 14 projecting outside the last element the robot arm can be bent in all directions. If a bending movement is desired between two actuating means 14, as shown in FIG. 2, these are both subjected to a pull, whereby the bending movement can be more or less displaced toward the first or second means 14 by altering the magnitudes of the pulls. The arm 10 can thereby also be brought to perform a rotational movement about its longitudinal axis.

A flexible transmission means 16 passes through the central openings 13 in the elements, said transmission means being intended to transmit tensile—compressive——and/or rotational forces to a tool 23 (FIG. 4) or the like arranged at the free end of the arm.

As can be seen from FIG. 3 the elements can be kept together in groups, where each group is operated with actuating means 14 special for this group. The arm according to FIG. 3 comprises two groups, a lower group A and an upper group B. The elements 11a of the group A are operated by the actuating means 14a, while the element 11b of the group B are operated by the actuating means 14b. In order to achieve the double-curve shown in FIG. 3 of the arm in one plane, two diametrically opposed actuating members 14a and 14b are actuated as shown with arrows. The two groups A and B of the arm can also perform bendings in different planes by appropriate actuation of the means 14a and 14b. The arm can of course also be provided with more than two groups of elements, so that it even can be bent 360° or more in different planes or directions if desired.

Figure 4:
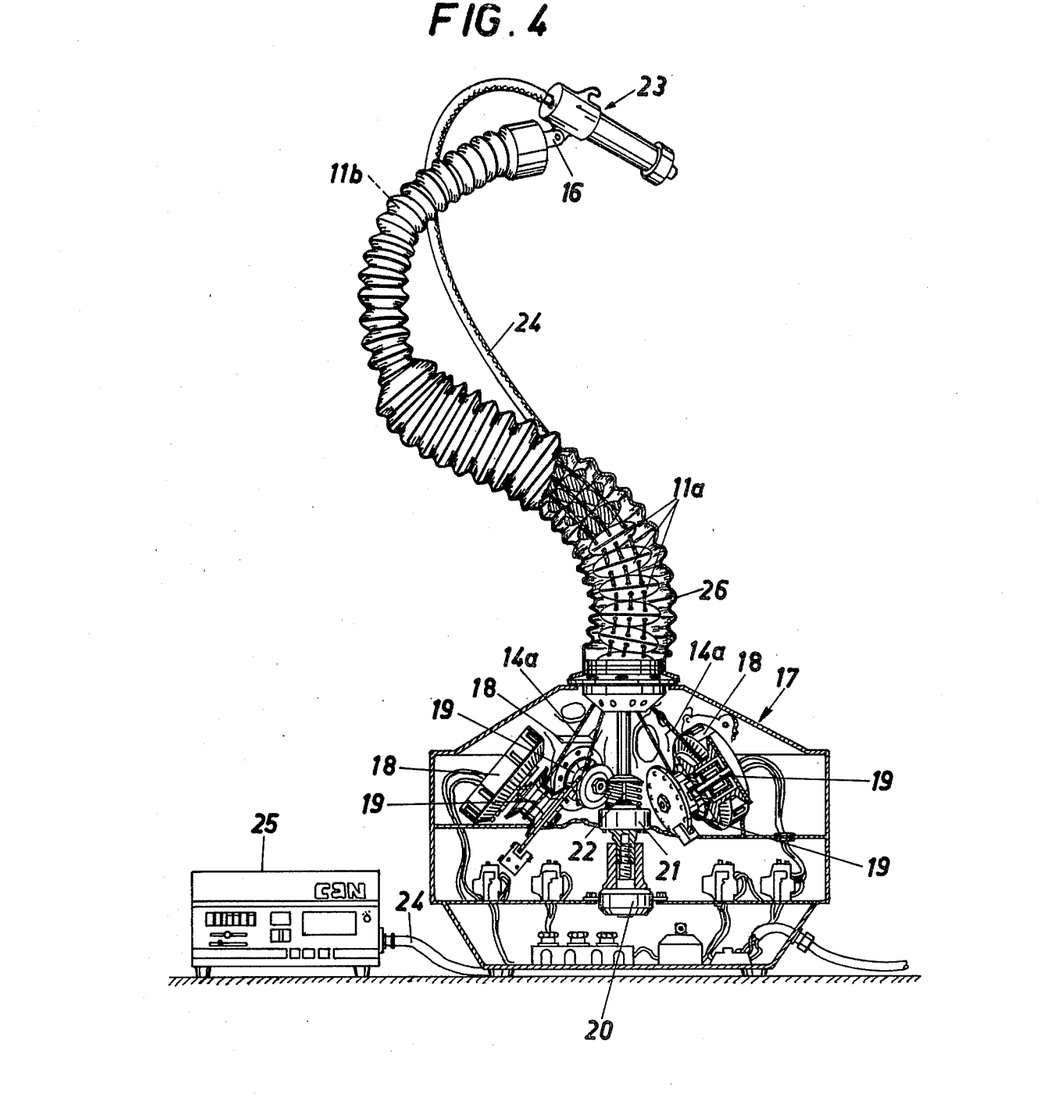
FIG. 4 is a front view of a complete industrial robot provided with a flexible arm according to FIG. 3.
Figure 6:
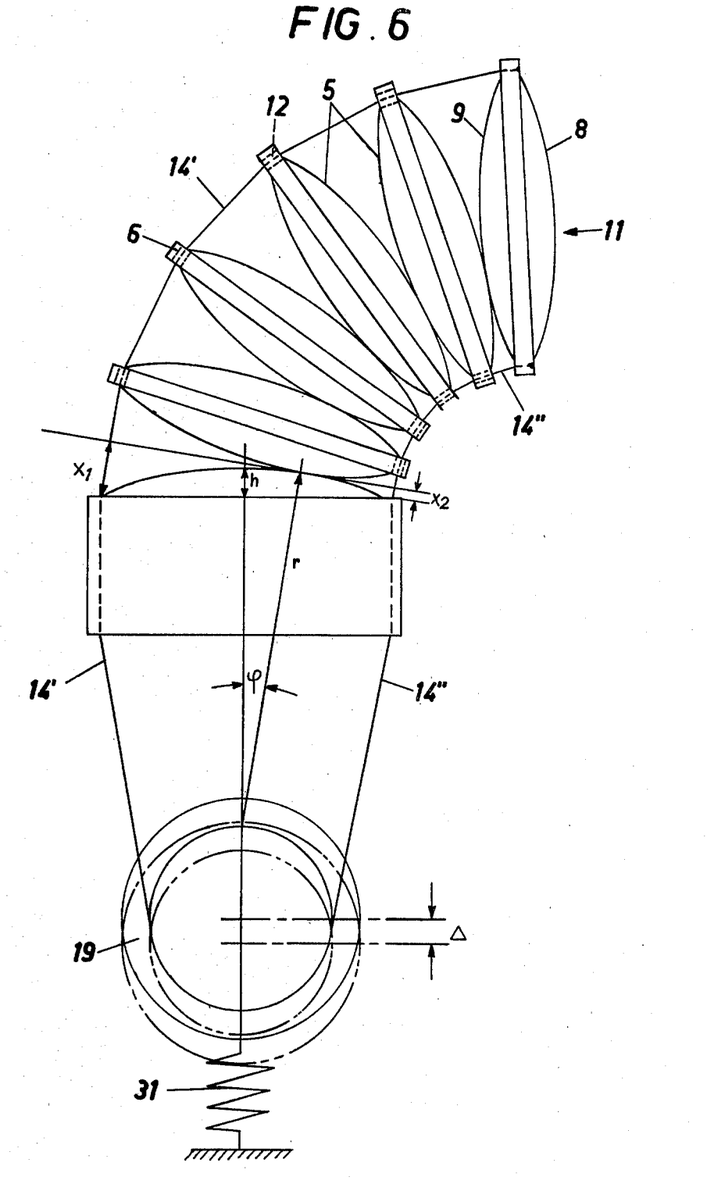
FIG. 6 shows on a larger scale a side view of a part of an arm and the geometry of the elements forming part thereof.

In FIG. 4 is shown a practical application of the arm according to the previous embodiment. The flexible arm 10 composed by two groups of elements 11a and 11b is with one end connected to a machine unit 17, which contains four servo-motors 18, which drive a winding drum 19 for each actuating means 14a and 14b. The motors 18 are reversible and so controlled that each actuating means—each wire—14a and 14b can be subjected to an individually adjustable force during the winding on operation as well as during the unwinding from the winding drum 19. Resilient prestressing means 31 (FIG. 6) are arranged for the wires 14.

The flexible transmission means 16 is at the lower end of the arm connected to a servo-motor 20 by way of a gear device 21 and an overload protective coupling 22. A tool 23 is connected to the central transmission means 16 at the free end of the arm, said tool comprising a spray gun fed through a tube 24 from a spray painting device 25.

For certain applications it is also possible to transport the work medium to the tool 23 through the central openings of the elements in parallel with the transmission means 16.

The separate elements 11 are enclosed in a protective flexible casing 26.

Figure 5:
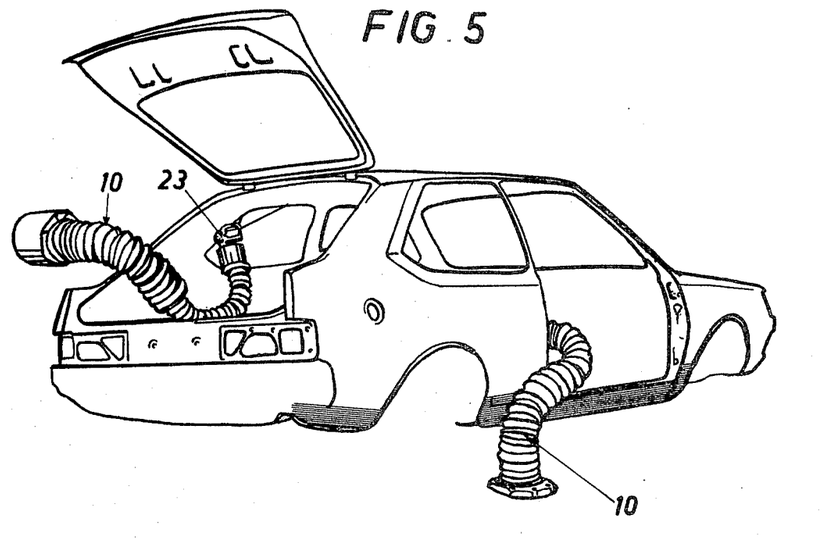
FIG. 5 illustrates in a perspective view the accessability of the robot arm around corners etc.

The flexibility, working range and accessability of the robot arm is illustrated in FIG. 5, which shows that the arm can be bent in such a way that it even can perform manipulations behind obstacles or in spaces otherwise difficult to reach.

Figure 7:
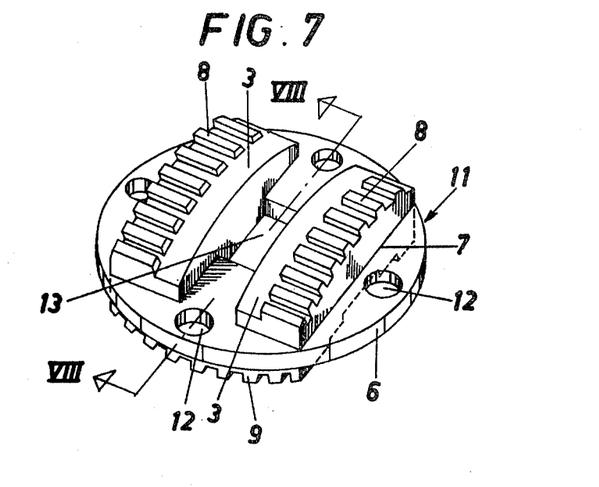
FIG. 7 is a perspective view of a lamella shaped element according to a modified embodiment.
Figure 8:
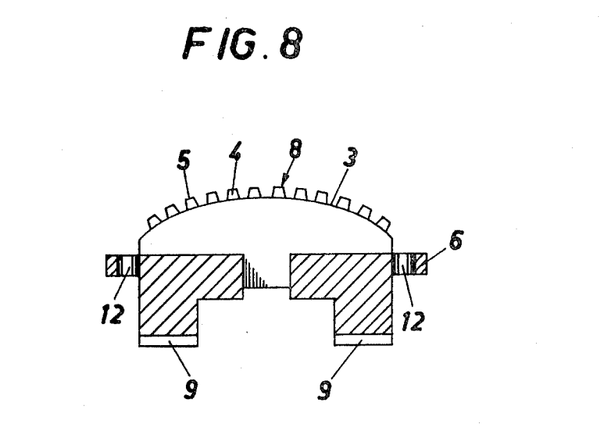
FIG. 8 is a section view taken along line VIII—VIII in FIG. 7.

In the embodiment according to FIGS. 7 and 8 each element 11 comprises two segment-shaped members 8 and 9 between which a spacing disc 6 is arranged. The segments 8 and 9 have each a single curved contact surface 5 and a plane base surface 7, with which the segments abut against a side each of the spacing disc 6. The segments 8 and 9 can either be attached to the spacing disc 6 or they can be formed intergral therewith. The segments 8 and 9 are arranged in mutually orthogonal planes, which means that every other segment can perform a bending movement in one plane and every other segment a corresponding bending movement in a plane perpendicular to the first mentioned plane. In order to obtain stable positions independent of the bending positions for the separate segments 8 and 9 and without being dependent on a good or poor friction between the contact surfaces, these can be provided with steering means 4, for example teeth cooperating with corresponding teeth in the adjacent element 11 at the relative movement of the segments. The segments 8 and 9 are preferably formed as portions of cylindrical toothed wheels, at which the centre of curvature of the single curved contact surface 5 or the centre of the pitch circle of the teeth are located outside each element respectively.

Flat segment portions 3 are arranged beside the teeth provided segments 8 and 9 on level with the root of the tooth.

By making the segments 8 and 9 as part cylindrical toothed wheels, in each element 11 arranged in mutually perpendicular planes, an alternating deflection possibility is achieved at each teeth engagement. The deflection angles are superposed and the arm is totally seen given the same possibilities to move as if the contact surfaces had been flat. This design also guarantees that a very good torsional rigidity is achieved since the elements owing to their shape can perform movements only in certain directions. Because of the tooth flange contact there will always be linear contact between two cooperating segments. The large tooth width and/or the flat segment portions 3 give a large contact surface, which in turn results in greater freedom of choice of materials for the segments. Instead of having to use hardened contact surfaces the new device permits the use of appropriate plastic, aluminium, or similar materials.

At previously known allround-flexible robot arms with a joint between each two elements the radius of the joint member r is equal to half the height h of the element, i.e. $r = \frac{1}{2}h$. This means that such elements do not have a certain definite position for a certain length of the wound up wire, and a robot arm comprising such elements therefore has not the required rigidity.

In order for an arm which comprises a great number of elements to be rigid it is required that a relative change of the position of the elements when bending the arm involves a change of the energy stored in the system. The higher this work is the more stable the arm will be.

This has according to the invention been achieved by the fact that the radius r of each segment 8 and 9 is larger, preferably even much larger than the height h of the segment. In that way the sum of the wire lengths x1 and x2—see FIG. 6—for each arbitrary torsional angle of the elements 11 will never be equal and this difference $\Delta$ represents a change of energy of the arm system. Since the sum of the wire length 14', 14" wound up and wound out is constant, since the wire is wound on a common drum 19, $\Delta$ will be identical with the movement of the wire drum. This movement together with the spring force is an important energy addition for achieving the desired rigidity.

Figure 9:
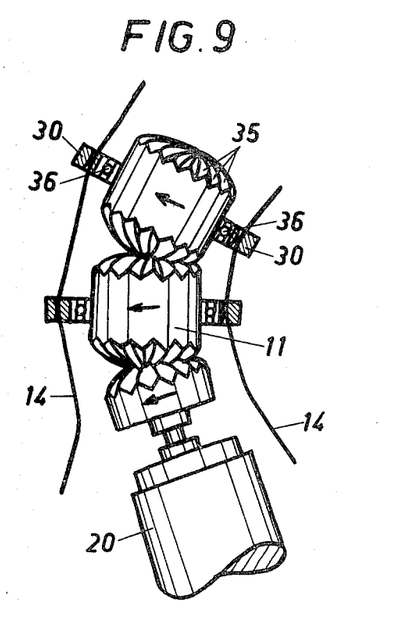
FIG. 9 is a side view partly in section of an embodiment, which can also perform rotational movements.

The modification shown in FIG. 9 is developed for making it possible also to transfer rotational movements by way of the elements, which for this purpose are provided with radial teeth 35 on the curved surfaces facing each other, said teeth engaging each other independent of which angular positions the elements take. In order to permit the rotational movement of the elements its flanges 30 with openings 12 for the wires 14 are rotatable relative to the element member, which has been achieved by arranging a bearing 36 between these parts. By means of a motor 20 the elements can in this way transfer rotational movements to the free end of the arm and to the tool 23 without in any way impairing the flexibility of the arm.

For transferring great loads and/or moments it is preferred to supplement the wire cable-shaped actuating means 14, which only have a connecting function, with electromagnetic or hydraulic servo-motors.

Figure 10:
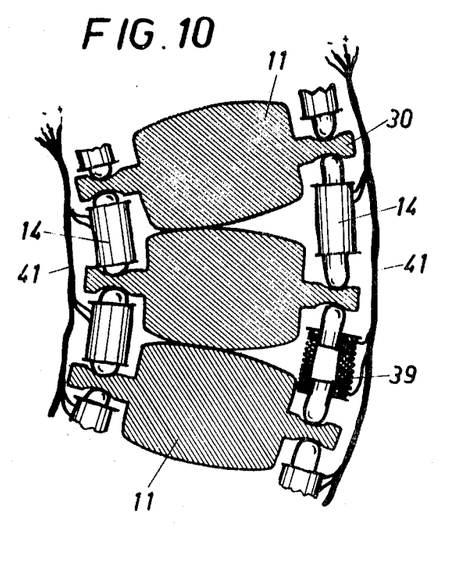
FIGS. 10 and 11 show sections through two embodiments, where the elements are actuated in electro-magnetic way.

The embodiment according to FIG. 10 shows a modification with electromagnetic adjustment of the angular position of the elements relative to each other, whereby between each flange 30 are pivotally mounted electromagnets 39, which are arranged to adjust the distance between the elements. Each electromagnet can possibly be individually actuated for providing the highest possible moveability and flexibility.

Figure 11:
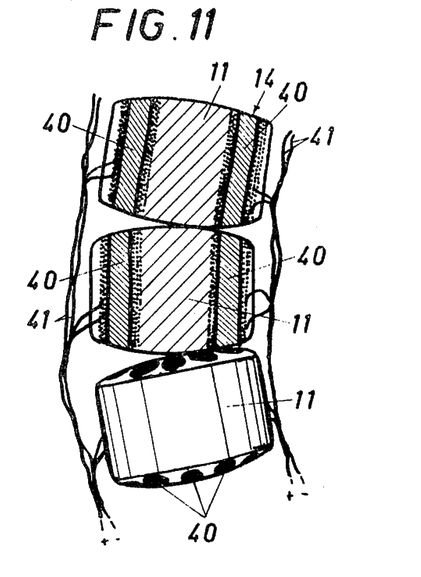

Instead of arranging moveable iron cores in a coil, as the embodiment shown in FIG. 10 is it possible to use non-moveable electromagnets oriented axially in the elements as shown in FIG. 11. Each non-moveable electromagnet 40 has its poles facing each other and in order to achieve a variable bending of the arm several such bar shaped magnets can be arranged in a radial pattern in the elements.

In both embodiments according to FIGS. 10 and 11 electric supply cables to the electromagnets are denoted with 41.

Figure 12:
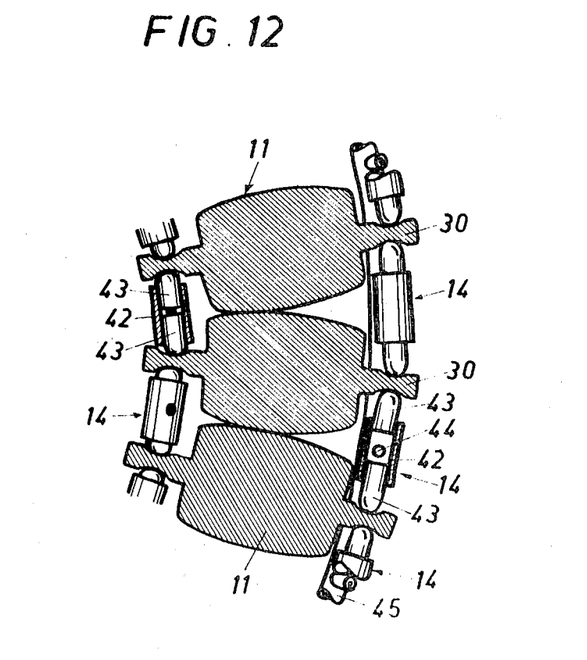
FIGS. 12, 13 and 14 show further embodiments with hydraulic or pneumatic actuation of the elements.

Electromagnetic actuating means usually work only between two fixed end positions, whereby a stepless adjustment of the bending of the arm is impossible. This limitation is eliminated with the embodiment shown in FIG. 12, where the actuating means 14 comprise hydraulic or pneumatic servo-motors in the form of cylinders 42 with double opposed pistons 43. The pressure medium can be supplied from a feed tube 45 through a central inlet or outlet 44. The pistons 43 are pivotally mounted at the peripheral flange 30 of the elements. The feed tube 45 is preferably passed through apertures in the flange 30.

Figure 13:
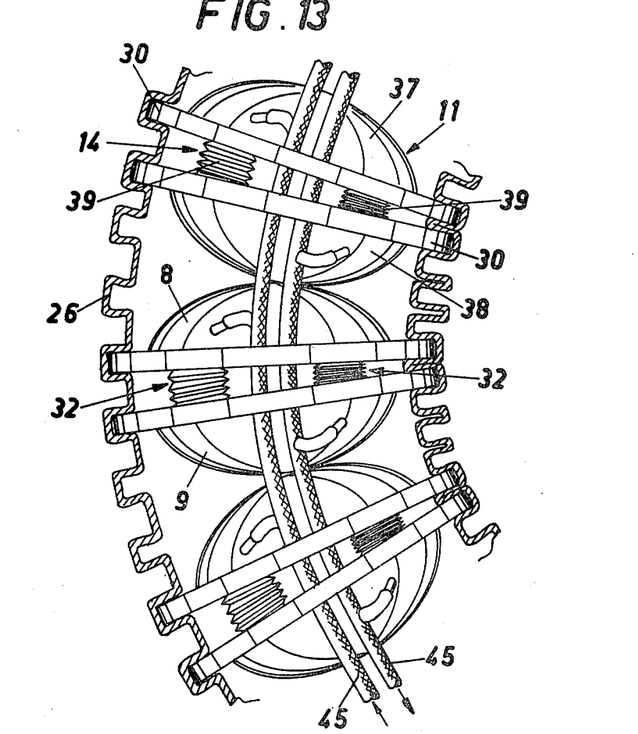

In FIG. 13 is shown an embodiment where the elements are divided into two parts along the peripheral flanges and where each part 37 and 38 is provided with a peripheral flange 30. Servomotors 32 are arranged between these two parts 37 and 38 in such a way that the two parts can take up different relative inclined positions. The servomotors 32 consist of short-stroke hydraulic or pneumatic motors, for example piston cylinder devices or bellows actuated by a pressure medium. At least three such motors are arranged at equal distances from each other and conduits 45 supplies them with pressure medium.

Figure 14:
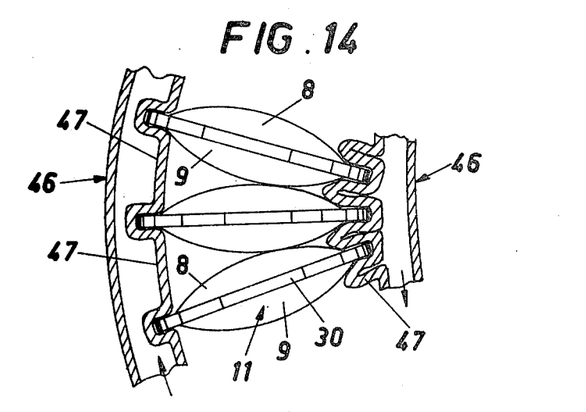

A further embodiment where the elements are actuated by hydraulic or pneumatic means is shown in FIG. 14. A number of pressure tubes 46 with radially projecting pressure lips 47 are arranged to operate between the peripheral flanges 30 of the elements. When a pressure is supplied in the tube 46 the pressure lips 47 will expand and displace the flanges 30 of the elements from each other. The tubes 46 can possibly be an integral portion of the casing 26 of the arm 10.

What we claim is:

1. A flexible arm, particularly a robot arm, for supporting and/or manipulating tools or the like, wherein a number of elements are arranged in series for contacting each other and power-generating and power-transmitting actuating means are provided and arranged to operate the elements to move them with respect to each other comprising each said element has segments with convexly curved surfaces substantially oppositely disposed with respect to each other, the curved surfaces of each of said segments engaging the adjacent curved surfaces of the adjacent segments so that said elements have a rolling motion in relation to each other when actuated by said actuating means, the radius of curvature of said curved surfaces being relatively considerably larger than the height of said segments.

2. A flexible arm according to claim 1, wherein curved contact surfaces of the segments have an elliptical shape.

3. A flexible arm, particularly a robot arm, for supporting and/or manipulating tools or the like, wherein a number of elements are arranged in series for contacting each other and power-generating and power-transmitting actuating means are provided and arranged to operate the elements to move them with respect to each other comprising each said element has segments with convexly curved surfaces substantially oppositely disposed with respect to each other, the curved surfaces of each of said segments being single-curved surfaces arranged in mutually orthogonal planes and engaging the adjacent curved surfaces of the adjacent segments so that said elements have a rolling motion in relation to each other when actuated by said actuating means, the radius of curvature of said curved surfaces being relatively considerably larger than the height of said segments, each element having a peripheral flange between the segments thereof, and said actuating means comprises means to apply force between said flanges of adjacent elements at circumferentially spaced positions.

4. A flexible arm according to claim 3, wherein at least a portion of said curved surfaces of each segment is provided with meshing elements arranged to engage adjacent meshing elements during the relative movement of the elements.

5. A flexible arm according to claim 4, wherein said meshing elements comprise radial ridges and grooves to form teeth.

6. The flexible arm of claim 4 wherein said elements are rotatably mounted in said flanges and means are provided to rotate said elements.

7. A flexible arm according to claim 3, wherein said single-curved surface of each segment is a part of a cylindrical toothed wheel.

8. A flexible arm according to claim 3 wherein said flanges have peripheral spaced openings therein, said actuating means comprises flexible cables capable of transmitting tractive and compressive forces, a servo-motor operably connected to one end of each of said flexible cables, the opposite end of each cable being fixed to the last element from the servo-motor and said cables being arranged to pass freely through said openings in the flanges of the intermediate elements.

9. A flexible arm as claimed in claim 3 wherein each said element comprises a disc member having said segments mounted on the opposite sides thereof, each segment on each side comprising a pair of spaced gear segments which engage the adjacent gear segments of the adjacent elements.

10. A flexible arm according to any one of claims 1, 2, 4, 5, 7, 8 or 3, wherein said elements are provided with at least one central through-passage.

11. A flexible arm, particularly a robot arm, for supporting and/or manipulating tools or the like, wherein a number of elements are arranged in series for contacting each other and power-generating and power-transmitting actuating means are provided and arranged to operate the elements to move them with respect to each other comprising each said element has segments with convexly curved surfaces substantially oppositely disposed with respect to each other, the curved surfaces of each of said segments engaging the adjacent curved surfaces of the adjacent segments so that said elements have a rolling motion in relation to each other when actuated by said actuating means, the radius of curvature of said curved surfaces being relatively considerably larger than the height of said segments, each element having a peripheral flange between the segments thereof, and said actuating means comprises electromagnetic devices pivotally mounted between said flanges at circumferentially spaced positions and operatively associated therewith to control the spacing between said flanges at each of said circumferentially spaced positions.

12. A flexible arm, particularly a robot arm, for supporting and/or manipulating tools or the like, wherein a number of elements are arranged in series for contacting each other and power-generating and power-transmitting actuating means are provided and arranged to operate the elements to move them with respect to each other comprising each said element has segments with convexly curved surfaces substantially oppositely disposed with respect to each other, the curved surfaces of each of said segments engaging the adjacent curved surfaces of the adjacent segments so that said elements have a rolling motion in relation to each other when actuated by said actuating means, the radius of curvature of said curved surfaces being relatively considerably larger than the height of said segments each element having a peripheral flange between the segments thereof, and said actuating means comprises fluid operated piston and cylinder means mounted between said flanges at circumferentially spaced positions and operatively associated therewith to control the spacing between said flanges at each of said circumferentially spaced positions.

13. A flexible arm as claimed in claim 12 wherein said actuating means is pneumatic.

14. A flexible arm as claimed in claim 12 wherein said actuating means is hydraulic.

* * * * *